(12) United States Patent
McMurtry et al.

(10) Patent No.: US 7,543,393 B2
(45) Date of Patent: Jun. 9, 2009

(54) METHOD OF CALIBRATING A SCANNING SYSTEM

(75) Inventors: David R. McMurtry, Dursley (GB); Geoffrey McFarland, Dursley (GB); Kevyn B. Jonas, Bristol (GB); Leo C. Somerville, St. Charles, IL (US)

(73) Assignee: Renishaw PLC, Wotton-under-Edge (GB)

( * ) Notice: Subject to any disclaimer, the term of this patent is extended or adjusted under 35 U.S.C. 154(b) by 15 days.

(21) Appl. No.: 11/987,103

(22) Filed: Nov. 27, 2007

(65) Prior Publication Data

US 2008/0083127 A1 Apr. 10, 2008

Related U.S. Application Data

(63) Continuation-in-part of application No. 10/581,604, filed as application No. PCT/GB2004/005276 on Dec. 16, 2004, now Pat. No. 7,318,284.

(30) Foreign Application Priority Data

Dec. 16, 2003 (GB) .................................. 0329098.8

(51) Int. Cl.
*G01B 5/004* (2006.01)

(52) U.S. Cl. .............................. 33/502; 33/503; 73/1.79

(58) Field of Classification Search ................... 33/502, 33/503, 556, 557, 558, 559, 560, 561
See application file for complete search history.

(56) References Cited

U.S. PATENT DOCUMENTS

| | | | |
|---|---|---|---|
| 4,603,487 A * | 8/1986 | Matsunata | .................... 33/503 |
| 4,819,195 A | 4/1989 | Bell et al. | |
| 6,484,571 B1 * | 11/2002 | Hidaka et al. | ................. 33/556 |
| 6,601,311 B2 | 8/2003 | McMurtry et al. | |
| 6,701,267 B2 | 3/2004 | Noda et al. | |
| 6,701,268 B2 | 3/2004 | Noda et al. | |
| 6,909,983 B2 | 6/2005 | Sutherland | |
| 7,055,367 B2 | 6/2006 | Hajdukiewicz et al. | |
| 7,254,506 B2 | 8/2007 | McMurtry et al. | |
| 7,318,284 B2 * | 1/2008 | McMurtry et al. | ............ 33/503 |
| 2002/0174555 A1 | 11/2002 | McMurtry et al. | |
| 2003/0009257 A1 | 1/2003 | Sutherland et al. | |
| 2004/0244464 A1 | 12/2004 | Hajdukiewicz et al. | |
| 2006/0053646 A1 | 3/2006 | McFarland | |
| 2006/0266100 A1 | 11/2006 | McMurtry et al. | |
| 2008/0083127 A1 * | 4/2008 | McMurtry et al. | ............ 33/502 |

FOREIGN PATENT DOCUMENTS

EP 0 318 557 B1 4/1992

(Continued)

*Primary Examiner*—G. Bradley Bennett
(74) *Attorney, Agent, or Firm*—Oliff & Berridge, PLC

(57) ABSTRACT

A method of measuring an object using a surface sensing device mounted on a coordinate positioning apparatus. The method has the steps of measuring a single surface point of a feature of the object with the surface sensing device, moving the surface sensing device along a path around the feature at a fast speed, thereby taking measurements along the path, including at the surface point, determining the difference between the measurements of the surface point and using the difference determined to apply a correction to the object or subsequent objects having the same feature.

17 Claims, 15 Drawing Sheets

FOREIGN PATENT DOCUMENTS

| WO | WO 90/07097 | | 6/1990 |
| WO | WO 92/20996 | A1 | 11/1992 |
| WO | WO 00/25087 | A1 | 5/2000 |
| WO | WO 00/62015 | A1 | 10/2000 |
| WO | WO 03/038375 | A1 | 5/2003 |
| WO | WO 2004/005849 | A1 | 1/2004 |

* cited by examiner

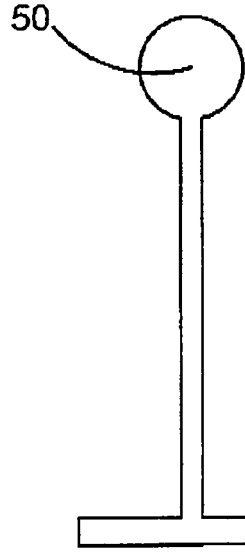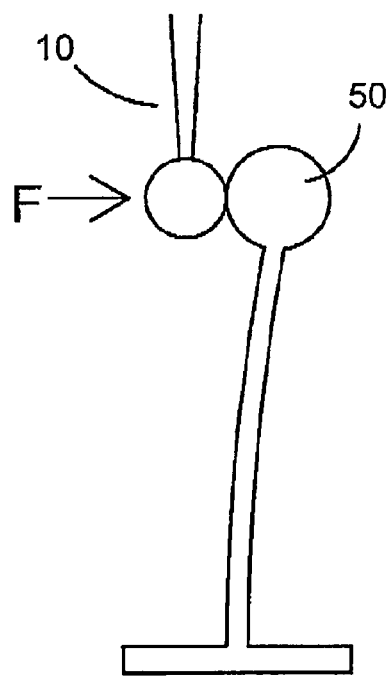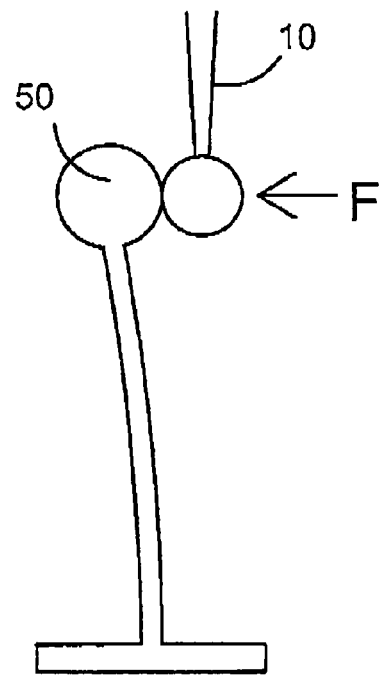
Fig 8　　　　　Fig 9　　　　　Fig 10
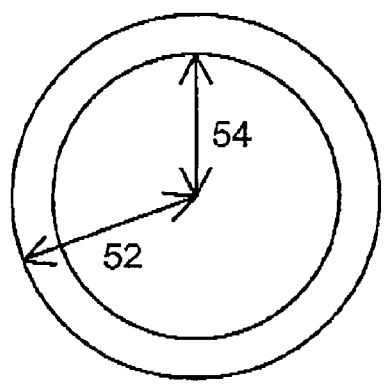
Fig 11

METHOD OF CALIBRATING A SCANNING SYSTEM

This is a Continuation-in-Part of application Ser. No. 10/581,604 filed Jun. 5, 2006. The disclosure of the prior application is hereby incorporated by reference herein in its entirety.

The present invention relates to a method of calibrating a scanning system. A scanning system in this specification should be understood to mean a combination of a machine and a probe which together are capable of use in scanning an object in order to obtain information about its size, shape or surface contours.

The machine may be, for example, a co-ordinate measuring machine (CMM), machine tool or robot etc, and the probe is a measuring probe with a workpiece-contacting stylus. One type of machine has measuring devices for measuring the movement of the machine parts in three nominally orthogonal directions (referred to as X,Y and Z axes), and one type of probe includes measuring transducers for producing outputs indicative of the displacement of the tip of the stylus relative to the probe in three nominally orthogonal directions (referred to as the a,b, and c axes). Although the term 'analogue probe' is used, the outputs for the a,b and c axes may be either analogue or digital.

In known systems, measurement errors are caused by unwanted deflections of the probe, machine structure and workpiece. Errors due to bending of the probe stylus are the same throughout the machine volume and may be compensated for by probe calibration. Errors due to deflections in the machine structure may be caused, for example, by the machine quill bending and the machine bridge twisting and vary throughout the machine volume. These errors increase, for example, with increasing cantilevers. Errors in the object to be measured may be caused by object deflection during measurement as a result of force by the probe.

Parts of the working volume of the machine may be calibrated for measurement errors by using a calibration artefact such as a calibration sphere. However usually the calibration artefact cannot be located at the same position in the machine's working volume as the part to be measured and is instead located to one side. The measurement errors determined at the calibration artefact will thus be different to those on the part.

Methods of correcting machines for acceleration induced errors are known. One example of such a method is described in European Patent No. 318557. In this method a first article from a batch of nominally identical articles is measured at a relatively slow speed, noting the measurements of the positions of a number of datum points on the article. The measurement operation is repeated at a relatively fast speed noting the measurements of the positions of the same datum points. Any difference in the measurements are noted as errors in a correction table.

Thereafter all of the articles are measured at the relatively fast speed taking measurements of the positions of corresponding points on each article, and these measurements are corrected for machine accelerations using the previously noted errors.

Another method of correcting errors is disclosed in WO00/62015. In this method a stylus of a probe mounted on a coordinate measuring machine is driven into contact with a surface of an object in a direction normal to its surface until a predetermined stylus deflection has been reached. The machine is then reversed whilst simultaneously recording the outputs of the machine measuring devices and measuring transducers of the probe. This process is repeated for a selection of datum points around the surface of the object. The measurements for each datum points are extrapolated to determine the measurement which would have been taken when the probe deflection is zero. This extrapolated value relates to when the probe is just in contact with the surface.

The object is then scanned at a slow speed and predetermined stylus deflection. The difference at the datum points between the initial measurements and the scan is recorded.

The scans are repeated at the same stylus deflection at greater speeds until the variation in the recorded differences between the fast scan and the initial measurements and the slow scan and the initial measurements exceeds a defined tolerance. The last speed which falls within this tolerance is the maximum scanning speed. A map of the positional errors at the datum points is stored along with the data relating to the scanning speed, particular artefact, particular CMM and probe and stylus configuration etc. It is possible to interpolate from this map to obtain radial errors at angles in between the radial directions at which actual data was obtained (i.e. the datum points).

This method has the disadvantage that the step of collecting the datum points is time consuming.

The present invention provides a method of measuring an object with a coordinate positioning apparatus, comprising the following steps, in any suitable order:

placing the object within the working volume of the coordinate positioning apparatus;

measuring the object with a workpiece contacting probe to create measurement data of the object, the measurement data being collected at multiple probe forces;

for at least one location on the surface of the object, determining a function or look up table relating the measurement error data to probe force;

for said at least one location on the surface of the object, using the function or look up table to determine the measurement data corresponding to zero probe force;

and outputting the measurement data corresponding to zero probe force as the measurement of the object.

The term measuring includes taking measurements using either a scanning probe or a touch trigger probe.

The measurement data corresponding to zero measurement force may be determined by extrapolation.

The measurement data may be collected at known constant forces or at known varying forces.

Preferably the step of measuring the object with a workpiece contacting probe comprises scanning the object.

The function may be a linear function. The function may be a parametric function.

In one embodiment, the object is measured along a scan path and measurement data is collected at multiple probe forces for a section of the scan path;

the function or look up table relating the measurement data to the probe force is determined for locations on said section of the scan path;

and wherein for locations on the scan path but not on said section of the scan path, the function or look up table relating the measurement data to the probe force is determined from measurement data collected on said section of the scan path.

The function or look up table relating the measurement data to the probe force for locations on the scan path but not on said section of the scan path is determined from component parts of the function or look up table relating the measurement data to the probe force on said section of the scan path. The component parts may comprise components of two axes, for example the X and Y axes.

The object may be measured along the scan path by scanning a surface profile for one revolution at a constant or variable probe force. Measurement data may be collected at multiple probe forces for a section of the scan path by taking additional measurements on the scan path at a different probe force. The additional measurements may be taken by scanning the surface profile for at least a quarter revolution.

Alternatively, the measurements may be taken by taking measurements of the surface profile as the probe is moved radially towards or away from the surface at least two different locations.

A second aspect of the invention comprises a method of measuring an object with a coordinate positioning apparatus, comprising the following steps, in any suitable order:

placing the object within the working volume of the coordinate positioning apparatus;

measuring the object with a workpiece contacting probe to create measurement data of the object, the measurement data being collected at multiple stylus deflections;

for at least one location on the surface of the object, determining a function or look up table relating the measurement error data to the stylus deflection;

for said at least one location on the surface of the object, using the function or look up table to determine the measurement data corresponding to zero stylus deflection;

and outputting the measurement data corresponding to zero stylus deflection as the measurement of the object.

A third aspect of the invention comprises a method of measuring an object using a surface sensing device mounted on a coordinate positioning apparatus, the method comprising:

(a) measuring a single surface point of a feature of the object with the surface sensing device;

(b) moving the surface sensing device along a path around the feature at a fast speed, thereby taking measurements along the path, including at the surface point;

(c) determining the difference between the measurement of the surface point in step a) and in step b); and (d) using the difference determined in step c) to apply a correction to the object or subsequent objects having the same feature.

The surface point may be measured in step (a) at a slow speed. The measurement of the surface point in step (a) may be determined by taking multiple measurements of the surface point at different stylus deflections or probe forces and extrapolating the measurement data to that corresponding to zero stylus deflection or zero probe force.

The coordinate positioning apparatus may comprise an articulating probe head which can rotate a surface sensing device about two or more axes and wherein the step of moving the surface sensing device along a path in step (b) is achieved by motion of articulating probe head.

The feature may have a centre line and wherein in step (b) the articulating probe head is positioned at the centre line.

The surface sending device may be a measurement probe.

7. A method according to claim 6 wherein the measurement probe is a contact probe, having a workpiece contacting stylus which is deflectable from a rest position. The measurement probe may comprise a non contact probe.

A fourth aspect of the present invention provides apparatus for measuring an object using a surface sensing mounted on a coordinate positioning apparatus, the apparatus comprising a controller for carrying out the following steps:

(a) positioning the surface sensing device to measure a surface point of a feature of the object;

(b) moving the surface sensing device along a path around the feature at a fast speed, thereby taking measurements along the path, including at the surface point;

(c) determining the difference between the measurement of the surface point in step a) and in step b); and (d) using the difference determined in step c) to apply a correction to the object or subsequent objects having the same feature.

The surface point may be measured in step (a) at a slow speed. The measurement of the surface point in step (a) may be determined by taking multiple measurements of the surface point at different stylus deflections or probe forces and extrapolating the measurement data to that corresponding to zero stylus deflection or zero probe force.

The coordinate positioning apparatus may comprise an articulating probe head which can rotate a surface sensing device about two or more axes.

The feature may have a centre line and wherein in step (b) the articulating probe head is positioned at the centre line. The intersection of said two or more axes may be positioned at the centre line.

The surface sensing device may comprise a measurement probe. The measurement probe may comprise a contact probe, having a workpiece contacting stylus which is deflectable from a rest position. The measurement probe may comprise a non contact probe.

Preferred embodiments of the invention will now be described with reference to the accompanying drawings in which:

FIGS. 8-10 are schematic illustrations of a feature being deflected under measurement force;

FIG. 11 illustrates the real diameter and the measured diameter of a feature having low stiffness;

Figure 1:
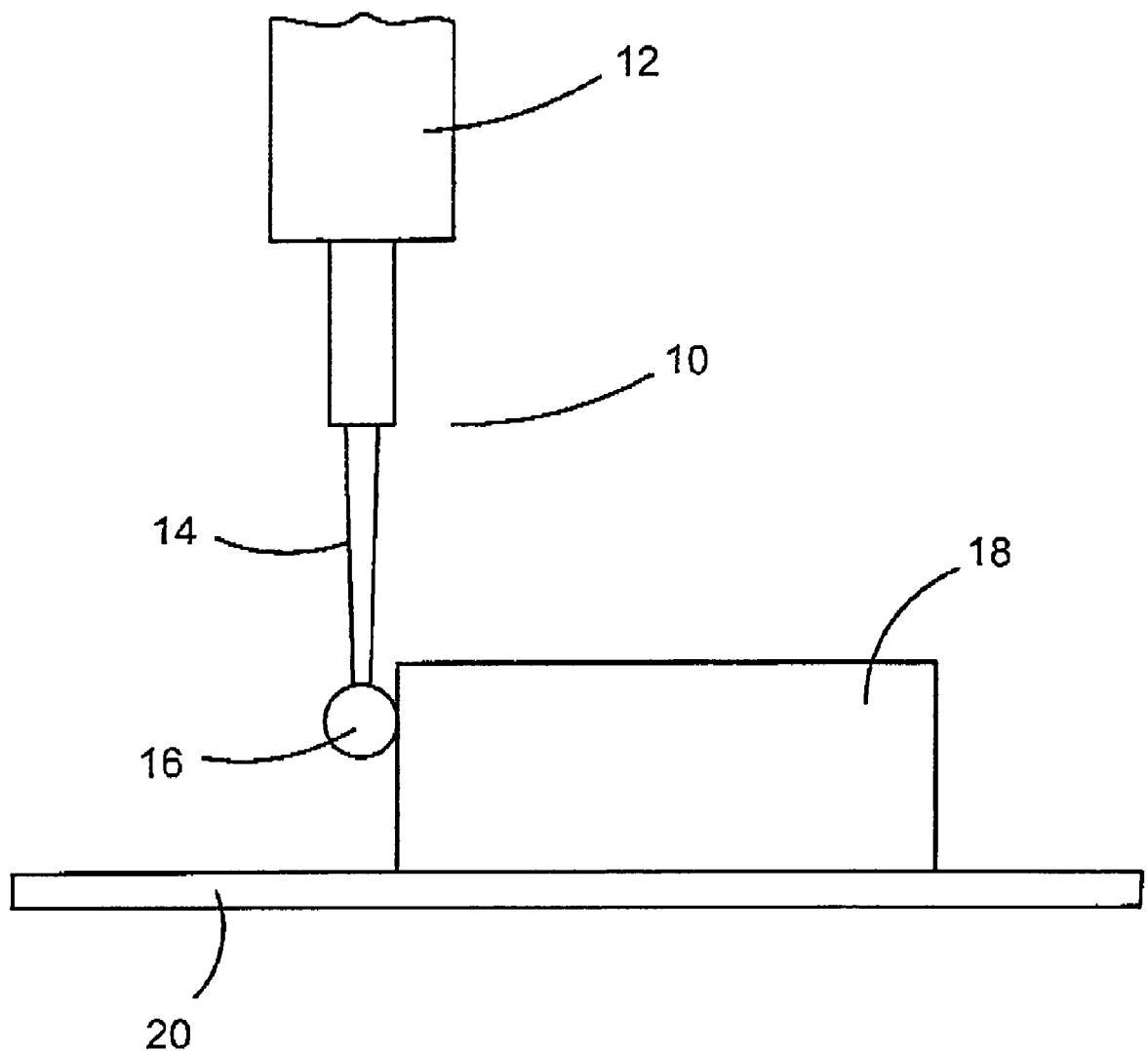
FIG. 1 is a schematic diagram of an analogue probe mounted on a coordinate measuring machine.
Figure 2:
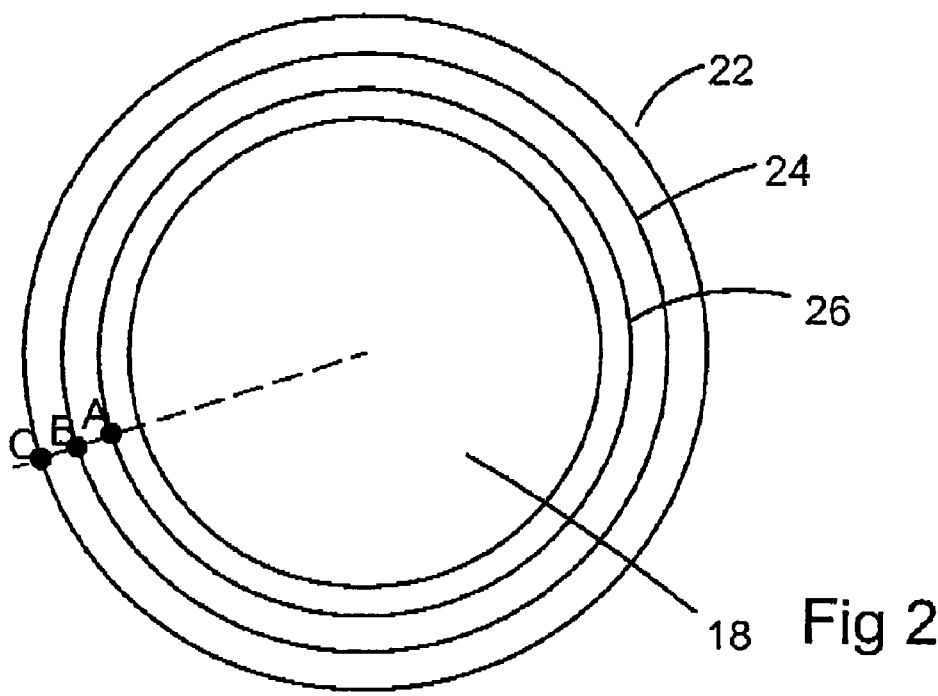
FIG. 2 is a schematic representation of several different constant stylus deflection scans around an object.
Figure 3:
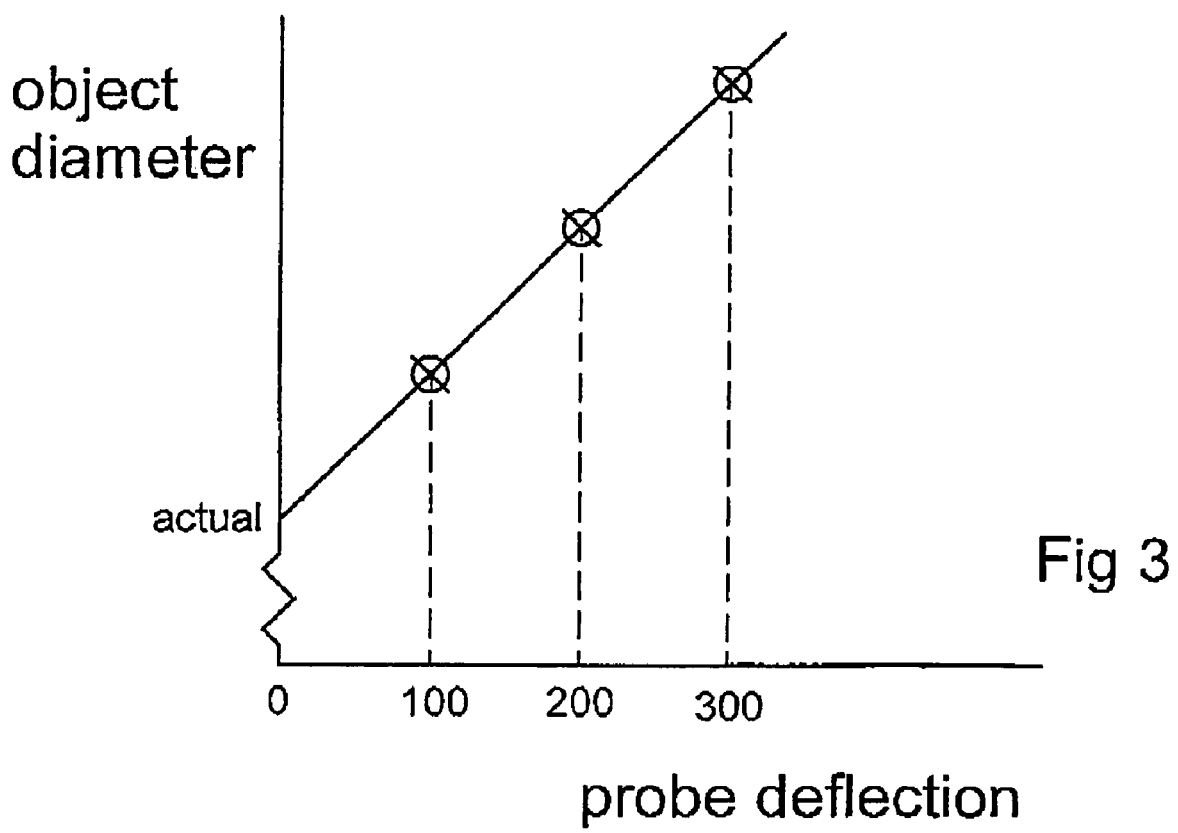
FIG. 3 is a graph illustrating probe deflection against object diameter.

In a first step of the invention, a measurement force error map is generated for an object. This is achieved by mounting an analogue probe 10 on the quill 12 of a coordinate measuring machine (CMM) (not shown) as illustrated in FIG. 1. The analogue probe 10 has a deflectable stylus 14 with a workpiece contacting tip 16. The object 18 to be measured is mounted on the CMM machine table 20 and the probe 10 is driven slowly by the machine quill 12 in a path around the object. The object 18 is first scanned along a path at a first constant probe deflection, for example 300 μm. The object is then scanned along this path at one or more different subsequent probe deflections. For example, the part may be scanned a second time with a probe deflection of 200 μm and a third time with a probe deflection of 100 μm. FIG. 2 shows a representation of the object 18 and the measurements obtained from the first 22, second 24 and third 26 scans around it. Each point on the object 18 will thus have three different measurements A,B,C, resulting from the three different scans at different probe deflections. For each point on the object, the measurements may be extrapolated back to calculate the measurement which would have been taken if the probe deflection was zero. FIG. 3 shows a graph of the probe deflection against object diameter. The actual object diameter is shown at zero probe deflection. The step of extrapolating to zero probe deflection allows the measurements at zero probe deflection to be determined without the errors of actual measurement, caused by probing force errors. A passive probe is suitable for use in this method, such a probe may comprise a stylus deflectable against springs.

This information enables a measurement force error map of the part to be produced. If the scans of the part were taken at a slow speed, this results in negligible dynamic errors due to very low accelerations of the probe and machine.

Figure 4:
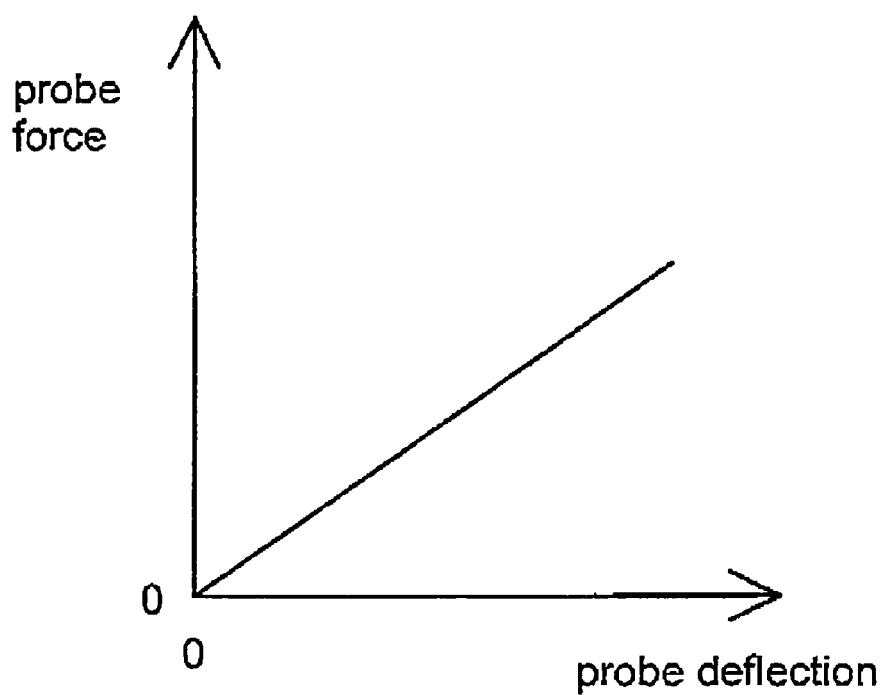
FIG. 4 is a graph illustrating probe force against probe deflection.

FIG. 4 shows the relationship of probe force against probe deflection. The probe acts within Hook's law such that when there is zero probe force, there is zero probe deflection.

Figure 5:
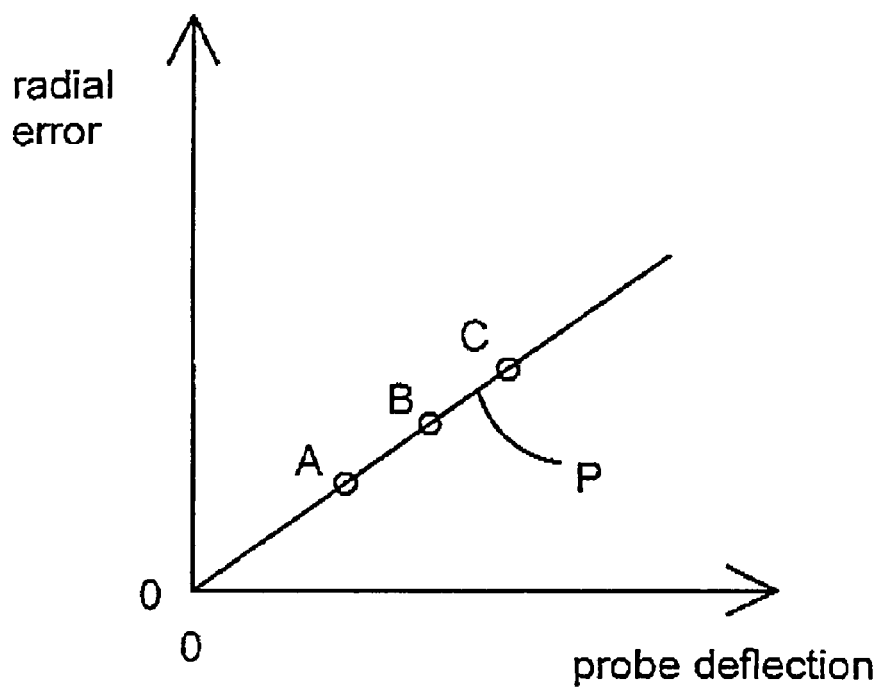
FIG. 5 is a graph illustrating the radial error against probe deflection

FIG. 5 illustrates the relationship of radial error against probe deflection. Points A,B and C relate to the radial error at probe deflection 100 μm, 200 μm and 300 μm respectively. By using these points to extrapolate to zero probe deflection, zero radial error is achieved. Once the function relating probe deflection and radial error has been determined, a subsequent measurement taken at any probe deflection, for example point P, may be corrected to zero radial error using this function. As there is a linear relationship between probe deflection and radial error, the function for correcting measurements at a given probe deflection is also linear.

Alternatively the measurement force error may be in the form of an error map. This could be in the form of a look-up table, with different error corrections for different stylus deflections. The error map could be in the form of a polynomial function.

Figure 6:
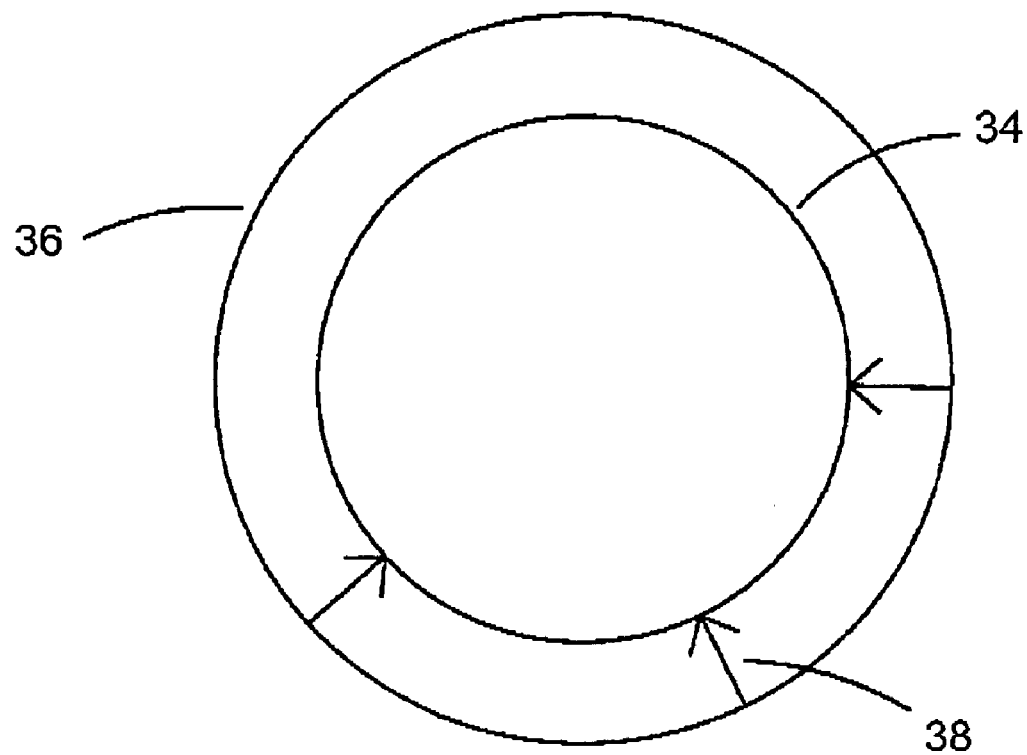
FIG. 6 is a schematic illustration of the static correction vectors.

FIG. 6 shows the error corrections for points on the scan. Each point on the scan has a different radial correction 38 which is applied for a certain stylus deflection. If a subsequent object is scanned at a stylus deflection of 300 μm 36, the measurement force error function or map may be used to correct the measured dimensions 36 taken at this stylus deflection to the actual part dimensions 34 corresponding to the part being scanned at a deflection of 0 μm.

Figure 16:
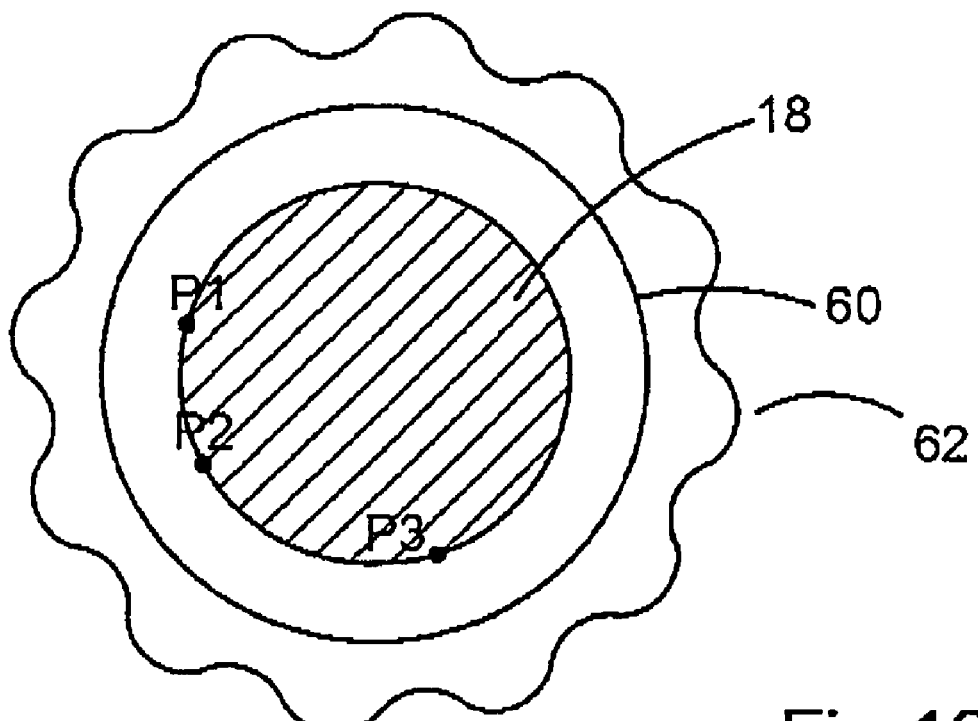
FIG. 16 is a schematic representation of a scan with a sinusoidally varying stylus deflection around an object.

This method is not limited to each scan having a constant deflection, as long as points on the object surface have measurement data corresponding to different stylus deflections to enable the measurement data to be extrapolated to zero. For example, FIG. 16 illustrates a first scan profile 60 around an object 18 taken at constant deflection and a second scan profile 62 taken using a sinusoidally varying deflection. Points P1,P2,P3 on the object surface thus each have two measurements taken at different probe deflections. This measurement data may be extrapolated to zero as previously described.

Figure 17:
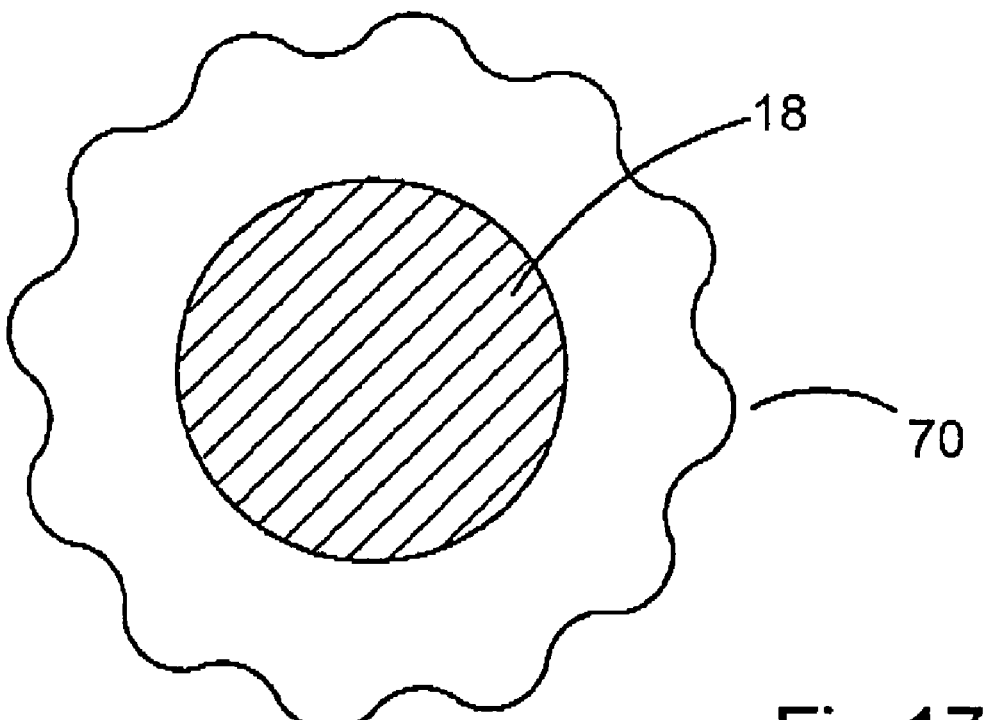
FIG. 17 is a schematic representation of a scan with a single sinusoidally varying stylus deflection around an object.
Figure 18:
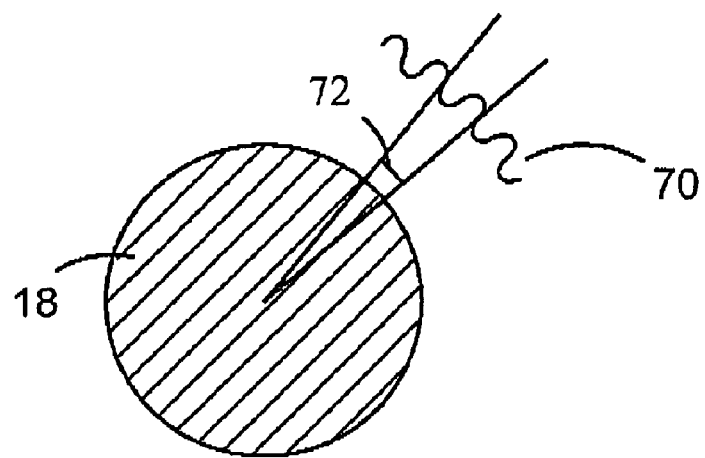
FIG. 18 illustrates a section of the scan profile of FIG. 17.

It is also possible to collect sufficient measurement data during a single varying scan profile. FIG. 17 illustrates a single scan profile 70 around an object 18, the scan profile 70 being taken using a sinusoidally varying stylus deflection. FIG. 18 illustrates a section of the scan profile 70. Over a small angle 72, scan profile 70 contains many data points taken at different stylus deflections. Assuming changes in the surface are small over angle 72 (eg part deflection and uniformity of surface), these data points taken at different stylus deflections over angle 72 may be used for the extrapolation to zero calculation. This is also possible if there is a change in the surface profile over angle 72, as long as the change can be assumed to be linear.

Figure 7:
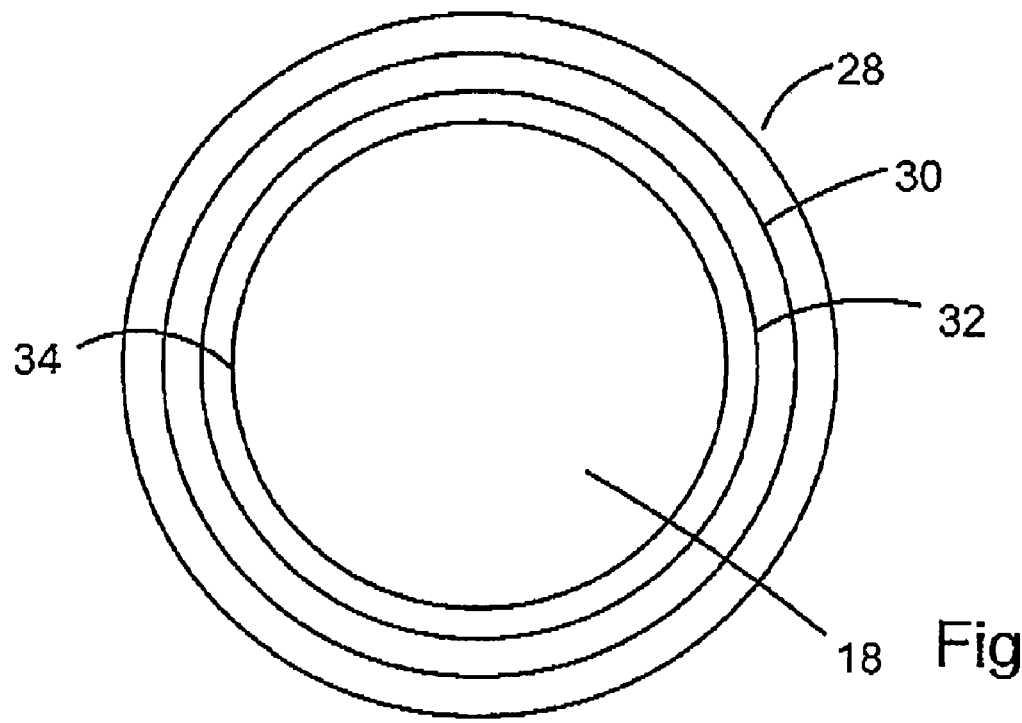
FIG. 7 is a schematic representation of several different constant force scans around an object.

Alternatively, instead of scanning the object several times at different probe deflections, it may be scanned several times with the probe having a different constant force for each scan. For example, the object may be first scanned with a constant force between the stylus and the object of 0.3 N. The object may then be scanned a second time with a constant force of 0.2 N and a third time with a constant force of 0.1 N. Each of these scans may have the same or different stylus deflections. FIG. 7 shows a representation of the object 18 with an actual part dimension 34 and the measured dimensions obtained from the first 28, second 30 and third 32 scans at different constant probe forces.

As before, for a point on the surface of the object, there are three sets of data relating to the scans at different probe forces. This data may be extrapolated back to enable the point which would be measured with zero force between the stylus and workpiece (i.e. the actual part dimensions) to be determined. As described previously, an error function or map may be created relating measurements taken at a given probe force to the correct measurements for a given point determined for zero probe force by the extrapolating to zero technique. Subsequent measurements at a given probe force may be corrected for measurement force errors using this measurement error function or map.

As with the previous method, sufficient data may be collected from a single scan of varying probe force (eg having a sinusoidal profile) to do the extrapolate to zero calculation.

This method is suitable for use in an active scanning probe, in which a motorised mechanism is used to control and modulate the contact force with the component to be measured.

The object may comprise a part of a series of parts to be measured. In this case a measurement force error map of this part is produced by this method. Alternatively, the object may comprise an artefact having features corresponding to the features on the parts to be subsequently measured. These features may be, for example, spheres, ring gauges, plug gauges etc. Use of the artefact allows geometric errors in addition to the probing force measurement errors, to be determined. Geometric errors are errors of the machine and probe, for example non-linearity of the machine scales or the machine axes not being straight. As the forms of the features on the artefact are known, they may be used to correct for geometric errors of the machine and probe. This may be done by comparing the extrapolated to zero data of the artefact with the known form of the artefact and producing a geometric error map to correct subsequent parts with.

This method may also be used to directly measure a part, without first creating an error map.

As previously described, a first measurement $R_1$ of the part is obtained at a first probe deflection or probe force $F_1$ and a second measurement $R_2$ of the part is obtained at a second probe deflection or probe force $F_2$. This may be repeated for subsequent measurements $R_n$ at different probe deflections or probe forces $F_n$. A function relating measurement data of the part to the probe deflection or probe force is determined from the measurements $R_1, R_2$ of the part and corresponding probe deflections or probe forces $F_1, F_2$. This function may be a linear or higher order curve (e.g. a parametric curve). The function is used to extrapolate the measurement data to provide the measurement data $R_0$ of the part relating to zero probe force $F_0$. However in this embodiment, the measurement data $R_0$ corresponding to zero probe force is calculated "on the fly", and thus without the requirement to first calculate an error map of the part.

The probe force (or stylus deflection) is considered to be zero when the force is at a level which does not cause any substantial measurement error.

Figure 19:
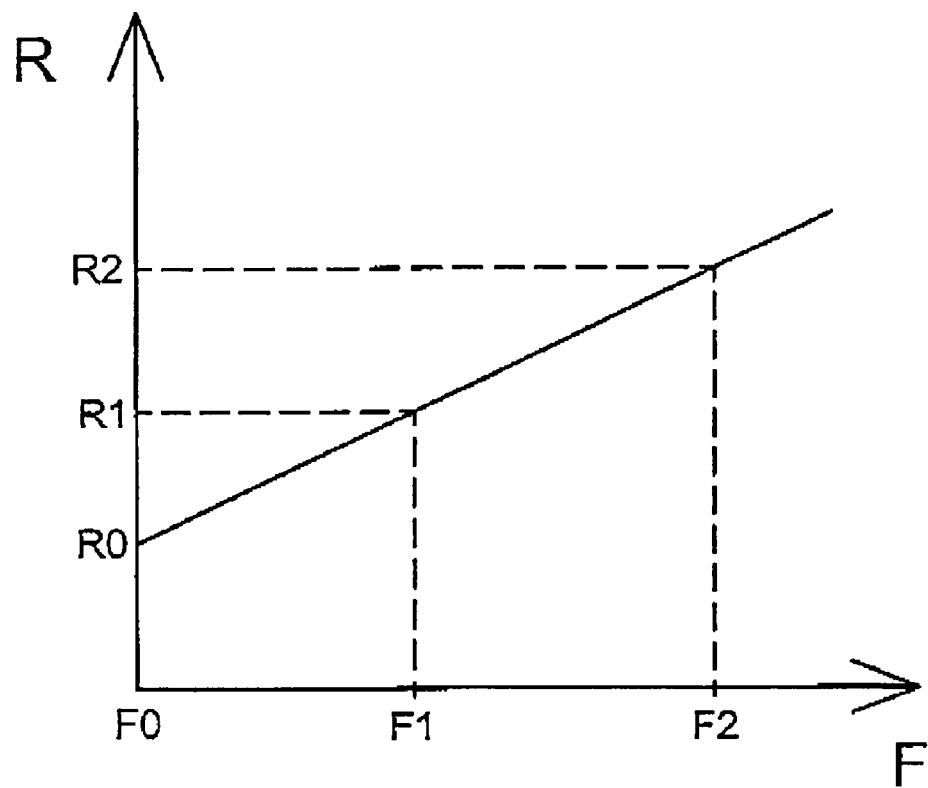
FIG. 19 illustrates a graph of a function relating part measurement R and probe force F.

FIG. 19 illustrates a linear function relating part measurement R and probe force F determined from the measurement data $R_1, R_2$ and the corresponding probe force $F_1$ and $F_2$. In this case, $R_0$ is determined by the equation:

$$R_0 = R_1 - \frac{(R_2 - R_1) \cdot F_1}{(F_2 - F_1)}$$

As described previously, at least one of the sets of measurement data may be obtained during a scan with non-constant probe deflection or probe force, for example a sinusoidal scan. Alternatively, a single scan of the part with varying probe deflection or probe force may enable sufficient data to be collected for the "on the fly" extrapolation calculation.

Figure 20:
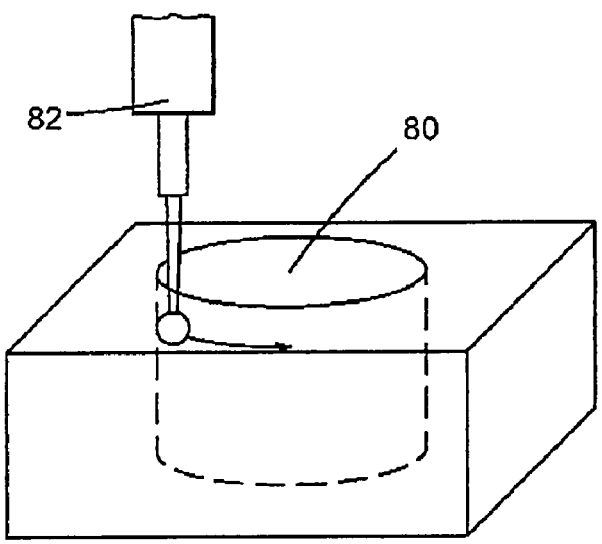
FIG. 20 illustrates a bore being scanned using the scan profile shown in either of FIG. 21 or 22.
Figure 21:
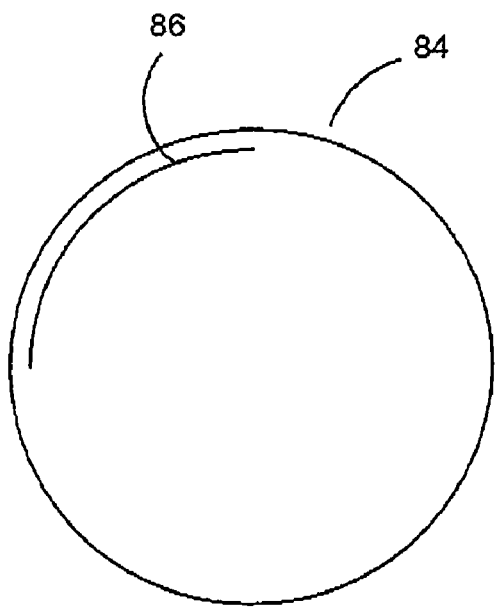
FIG. 21 illustrates a scan profile in which a bore is scanned a complete revolution and a quarter revolution.

It is not a requirement to have two complete scans of the feature to be measured. For example, FIG. 20 illustrates a bore 80 which is being scanned by a probe 82. FIG. 21 shows the scan profile of the bore, which is measured a first time 84 at a first probe deflection or force for a complete revolution. The bore is then scanned a second time 86 at a second probe deflection or force for a quarter revolution. The first 84 and second 86 scans may be at constant or variable probe deflection or probe force. As in previous embodiments, the data from the first and second scans are used to determine the surface measurement at points on the bore surface at zero probe force by extrapolation to zero. The data from the quarter scan 86 has sufficient information about the errors along the X and Y axes that scan data may be corrected around the whole circumference of the bore using this data.

Figure 22:
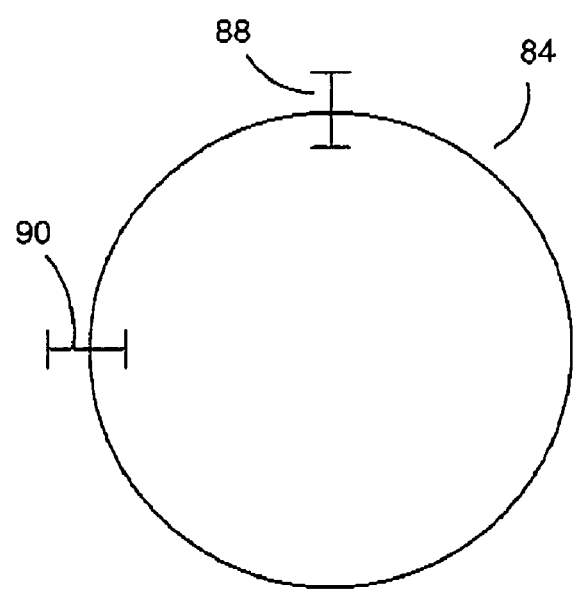
FIG. 22 illustrates a scan profile in which a bore is scanned a complete revolution and then radially at two locations.
Figure 23:
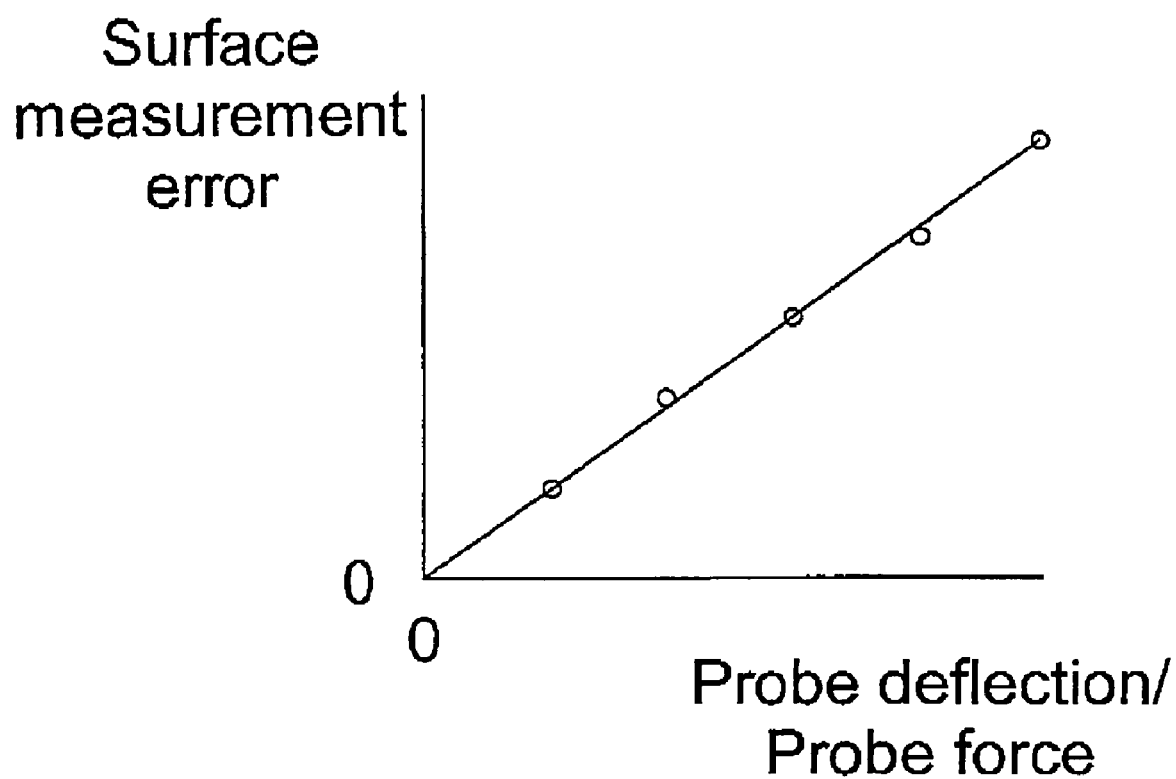
FIG. 23 is a graph illustrating a radial measurement used in the scan profile of FIG. 22.

The quarter scan may be replaced by two radial sets of measurements. For example FIG. 22 illustrates a scan profile of the bore in FIG. 20 in which the bore is scanned a first time 84 as before. Instead of the second quarter scan, the probe is brought radially towards and away from the surface of a bore at a first position 88, whilst taking surface measurements at different probe deflections or probe forces. FIG. 23 is a graph illustrating probe deflection against surface measurement for measurements taken at a point on the bore surface as the probe is moved radially towards the bore surface. This is repeated at a second position 90 on the bore surface, spaced angularly from the first. Preferably the radial measurements are 90° apart for ease of extracting the corrections along the X and Y axes, however the radial measurements may be spaced at different angles. As before, extrapolation to zero at the two radial positions enables a true measurement relating to zero probe force to be determined at two positions. Thus the error corrections relating to X and Y may be determined and hence measurements may be corrected across the whole bore.

This method is adequate when the walls of the feature being measured are sufficient thick so that there is no significant local part deflection, which would affect the correction at local areas of the bore.

A look up table may be provided as an alternative to a function. The look up table is produced from the same data that would define a function.

This method has the advantage that the errors due to probing force measurement errors and geometric errors can be separated. This would not be the case if, for example, measurement data from a scan with 300 μm deflection is compared with the known form of the artefact. In this case the probing force measurement error and geometric error would be combined into one correction and it would not be possible to separate them.

This method of correcting for separate measurement force errors and geometric errors has the advantage that it takes into account the errors due to deflection of the object being measured. Objects with low stiffness and/or thin walls may deflect with the probing force whilst being measured.

FIG. 8 illustrates a feature 50 to be measured which has low stiffness. When the feature is contacted with a probe 10, as shown in FIGS. 9 and 10, the feature deflects away from the probe. This deflection of the feature caused its diameter measured at force F to appear smaller than its actual diameter. FIG. 11 illustrates the actual diameter 52 of the feature and the measured diameter 54 using a probe force F. Similarly, the inner diameter of a ring would appear larger than its actual diameter for the same reason. At zero probe deflection or zero probe force there will be zero deflection of the feature. Thus the measurement force error function or map created by the method of this invention takes account of these errors by this extrapolating to zero step.

In a second step of the invention, the dynamic errors of the system are determined. Dynamic errors may be caused, for example, by machine bending due to acceleration. Once the measurement force error function or map has been produced as described above, the object is scanned at a high speed. The high speed scan is carried out at either constant probe deflection or constant force, as above. In addition, the high speed scan is preferably performed at a constant speed. The measurement data from this fast scan is compared with the measurement force error corrected slow scan relating to the actual dimensions of the object, produced as described in the first step of the invention. A dynamic error function or map may be produced by comparing the fast scan and the measurement error corrected slow scan. This dynamic error map is used to correct subsequent scans taken at a fast speed.

The subsequent scans do not need to have the same stylus deflection or probe force as the original fast scans as the dynamic error function relates the error to the deflection or force. However it is desirable to use a similar fast speed for the subsequent scans.

Figure 12:
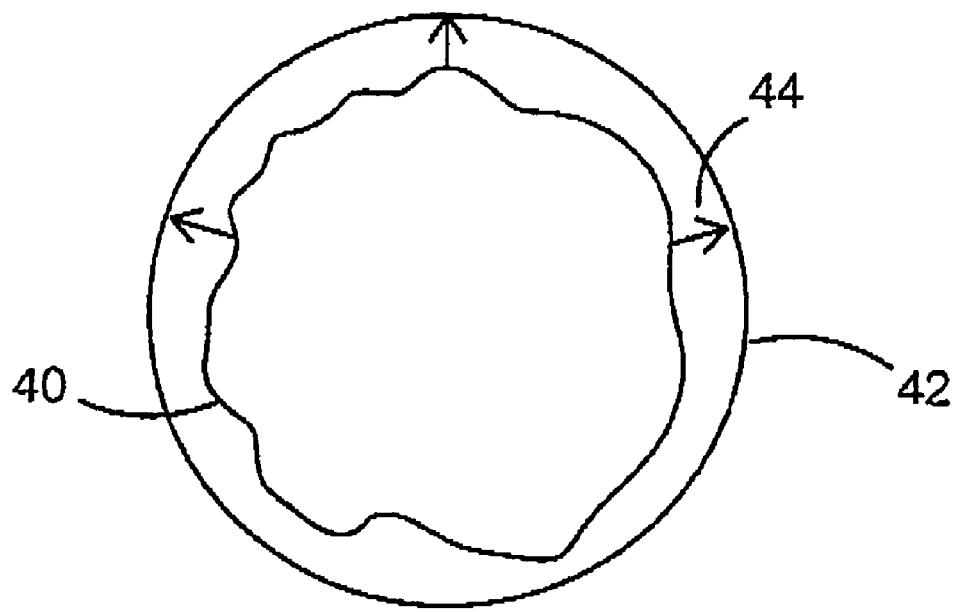
FIG. 12 is a schematic illustration of the dynamic correction vectors.

FIG. 12 illustrates the measurements taken during the fast scan 40 and the actual dimension 42 of the object created by measurement force error correcting the slow scan as previously described.

The dynamic error map has been combined with the measurement force error map or function to create a total feature map. This is done by adding the measurement force error correction vectors 38 around the part illustrated in FIG. 6 with the dynamic error correction vectors around the part to create combined correction vectors 44 illustrated in FIG. 12.

This method has the advantage that as the measurement errors are determined by scanning the object at different probe deflections or different forces, the measurement errors are known for every point on the surface of the object. Thus no interpolation is required.

In a second embodiment of the invention, the measurement force errors and the dynamic errors may be determined in combination. Such a method will now be described with reference to FIGS. 13 and 14.

Figure 13:
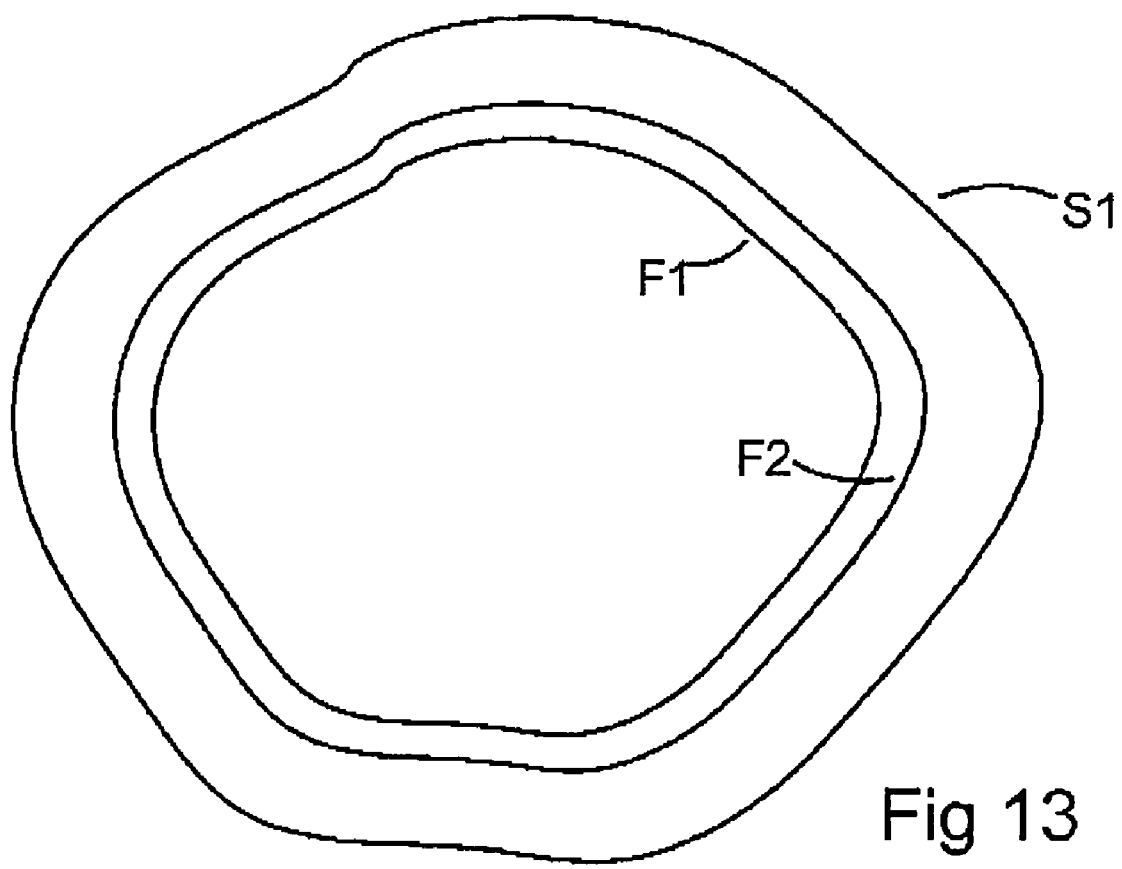
FIG. 13 illustrates the scan profiles during the method of a second embodiment of the invention.

In a first step, an object is scanned at a slow speed for example 10 mm/s with a first deflection, for example 200 μm. FIG. 13 shows the profile of the slow scan S1. The object is then scanned along the same path at a fast speed, for example 100 mm/s and at a second deflection, for example 100 μm. FIG. 13 shows the profile of the fast scan F1. The object is then scanned along the same path at the fast speed 100 mm/s and at the first deflection 200 μm. FIG. 13 shows the profile of the fast scan F2.

Figure 14:
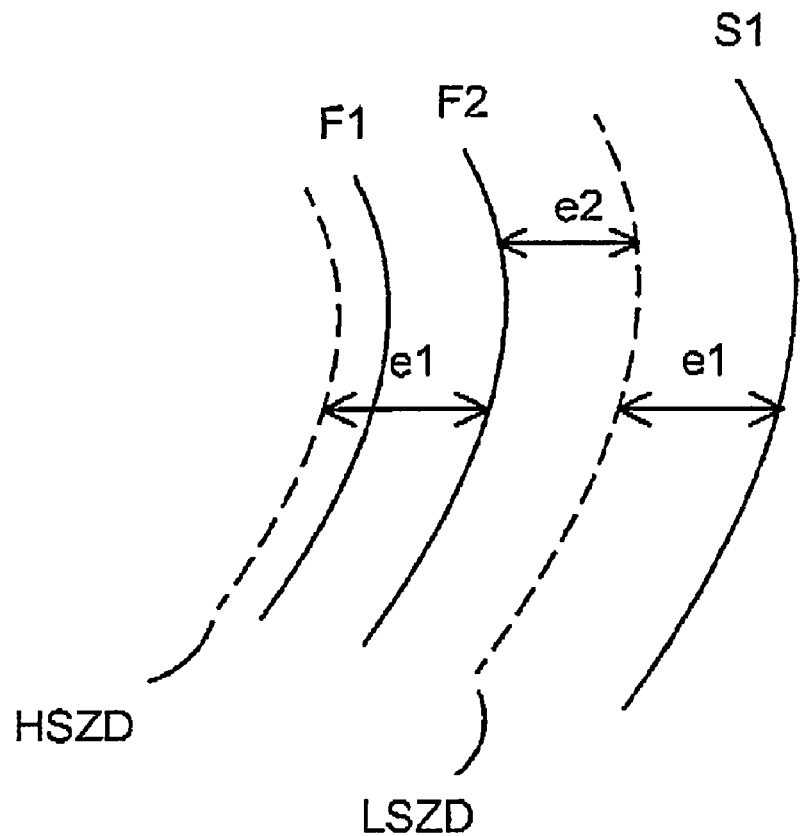
FIG. 14 shows a portion of the scan profiles of FIG. 13.

FIG. 14 shows a portion of the S1,F1 and F2 scan profiles around the object. F1 and F2 are profiles for scans of the same fast speed (100 mm/s) but different deflections (100 μm and 200 μm respectively). By extrapolating to zero deflection, the profile of the object for a high speed (100 mm/s) scan with zero deflection can be determined. This profile is shown as HSZD on FIG. 14. The error due to deflection of the F2 scan may thus be determined. This deflection error is shown as $e_1$, on FIG. 14.

As scans S1 and F2 were carried out with the same probe deflection (200 μm), the deflection error $e_1$, may be applied to the profile of scan S1 to find the profile corresponding to a scan at low speed with zero deflection. This profile is shown as LSZD on FIG. 14 and corresponds to the surface of the object.

The LSZD is now used as a base line. The error between the LSZD baseline and the F2 scan is now determined. This is labelled $e_2$ on FIG. 14. The errors $e_2$ may be stored as a correction map or function.

Subsequent objects may now be measured at a speed and deflection corresponding to scan F2 and corrected using the correction map or function.

This method may be used with a force-measuring probe rather than a deflection-measuring probe. In this case, scans S1 and F2 are carried out at a first probe force and scan F1 is carried out at a second probe force. The two fast scans must then be extrapolated to zero force to determine the high speed zero force profile and thus the error due to force of the F2 scan may be determined.

The measurements of the object during the S1,F1 and F2 scans may be determined by using either a scanning probe or a touch trigger probe. A touch trigger probe may be electronically loaded so that it triggers at a certain force. Thus during the S1 and F2 scans the probe is loaded to trigger at a first force and during the F1 scan the probe is loaded to trigger at a second force, enabling the two fast scans to extrapolate to zero force.

It is not necessary for the slow scan S1 to have the same stylus deflection or probe force as the fast scan F1. This is because the relationship between stylus deflection/probe force and measurement error is determined at the fast speed from scans F1 and F2, which enables comparison with any stylus deflection/probe force at the slow speed.

Figure 15:
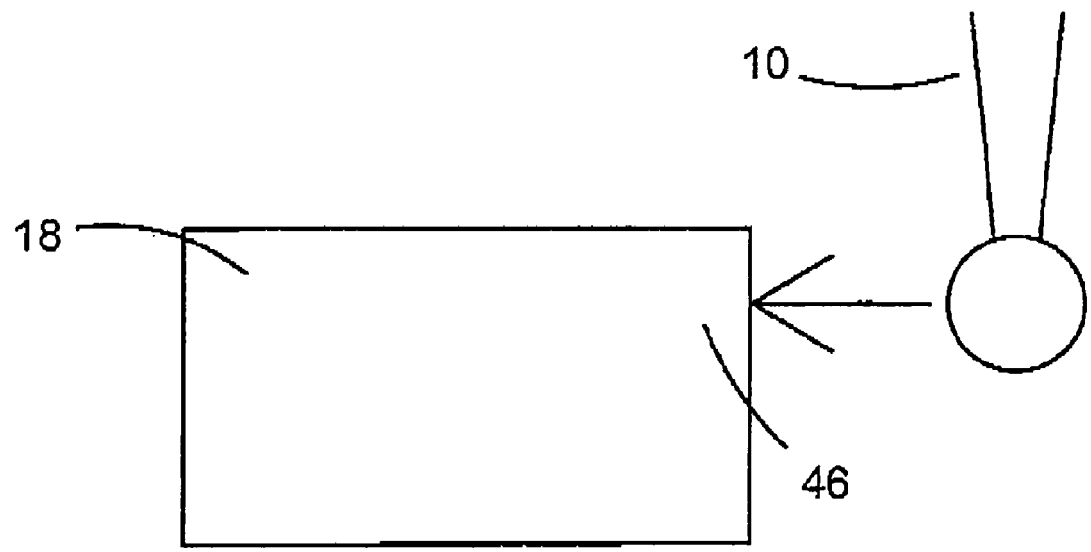
FIG. 15 illustrates a workpiece being measured according to a third embodiment of the invention.

A third embodiment of the invention will now be described with reference to FIG. 15. A stylus 10 of a probe is driven into contact with a surface of an object 18 along a path 46 in a direction normal to the object's surface until a predetermined stylus force has been reached. This step is repeated along the same path for a plurality of different predetermined stylus forces. The measurement data along this path is used to extrapolate back to enable the point which would be measured with zero forces between the stylus and workpiece to be determined. This is the nominal object measurement.

This process is repeated for a selection of datum points around the surface of the object. The data from each of these datum points is used to create an error map as previously described to correct subsequent measurements. Measurements of the surface of the object between the datum points are corrected by interpolating the error map between the datum points.

This method is suitable where the measurement probe is mounted on an articulating probe head which in turn is mounted on a coordinate positioning apparatus, such as a CMM. The articulating probe head enables the measurement probe mounted on it to be rotated about two or more axes. The articulating probe head can be considered as part of the coordinate positioning apparatus.

Figure 24:
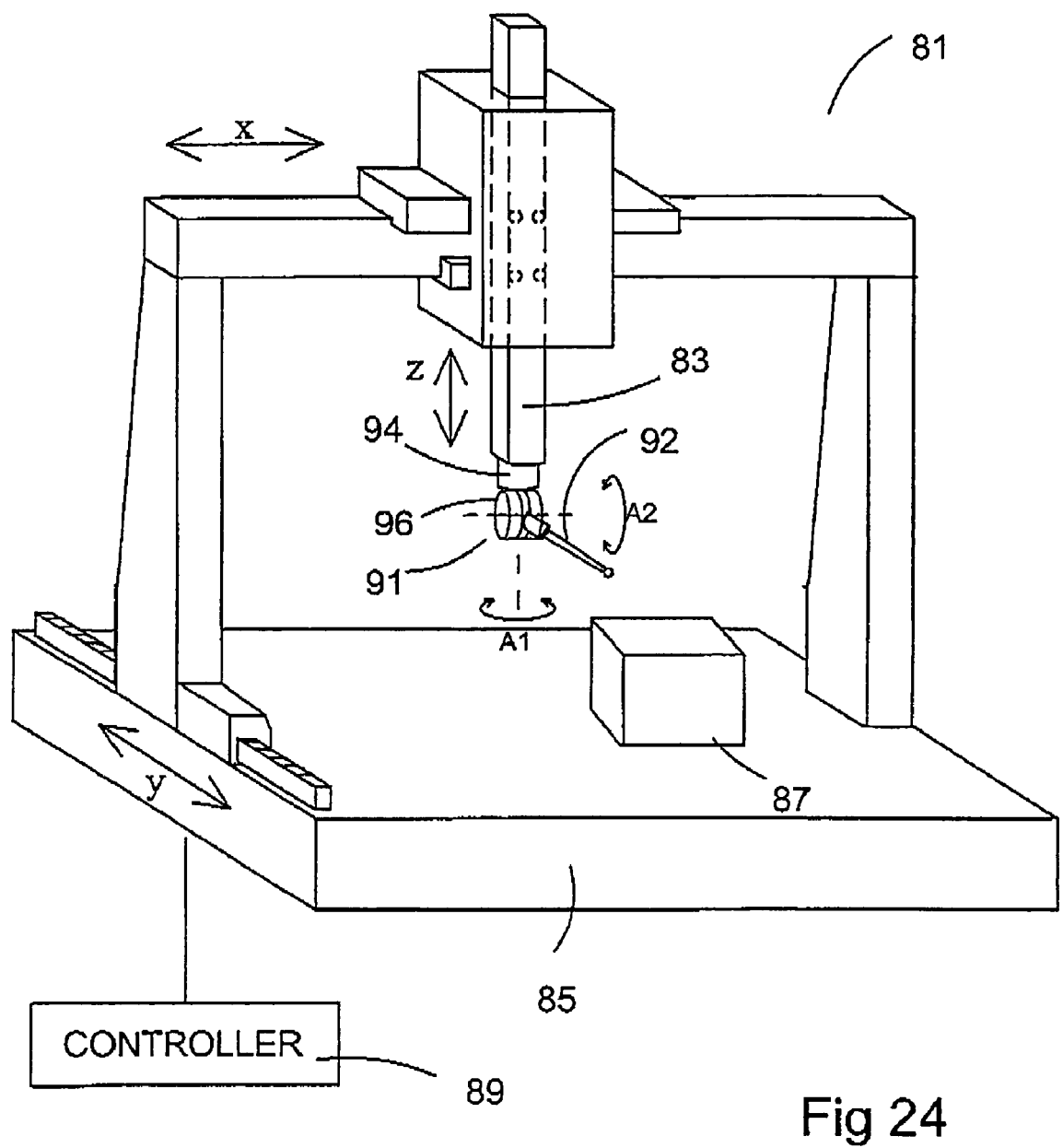
FIG. 24 illustrates an articulating probe head mounted on a coordinate measuring machine (CMM)

FIG. 24 illustrates a CMM 81 comprising a quill 83 moveable along X,Y and Z axes and a table 85 on which a workpiece 87 is mounted. Such a CMM is well known and will not be described further. An articulating probe head 91 is mounted on the quill of the CMM 81. Such an articulating probe head is described in more detail in WO 90/07097 which is herein incorporated by reference. The articulating probe head comprises a first housing 94 rotatable about a first axis A1 and a second housing 96 rotatable about a second axis A2. A measurement probe 92 is mounted on the articulating probe head 91 and can thus be rotated about the A1 and A2 axes by the articulating probe head and translated along the X,Y and Z axes by the CMM. A controller 89 is provided which outputs command signals to the CMM and articulating probe head and which receives inputs from the transducers of the CMM, articulating probe head and measurement probe. The controller may be a bespoke device or software on a computer. Subsequent manipulation of the measurement data, error determination and correction may also occur in the controller.

The articulating probe head provides rotation of the measurement probe about two axes and the CMM provides linear translation of the articulating probe head about three axes. Thus the coordinate positioning apparatus comprising the articulating probe head mounted on the CMM provides motion in 5 axes to the measurement probe. The articulating probe head may have an additional axis of rotation, for example rotating the measurement probe about its longitudinal axis.

A fourth embodiment of the invention will now be described with reference to FIG. 25. In this embodiment, the apparatus illustrated in FIG. 24 is used, i.e. a measurement probe 92 is mounted on an articulating probe head 91 which in turn is mounted on a CMM 81 or other suitable coordinate positioning apparatus. The measurement probe is a scanning probe, in which the transducers of the probe measure the deflection of the probe from a rest position.

Figure 25:
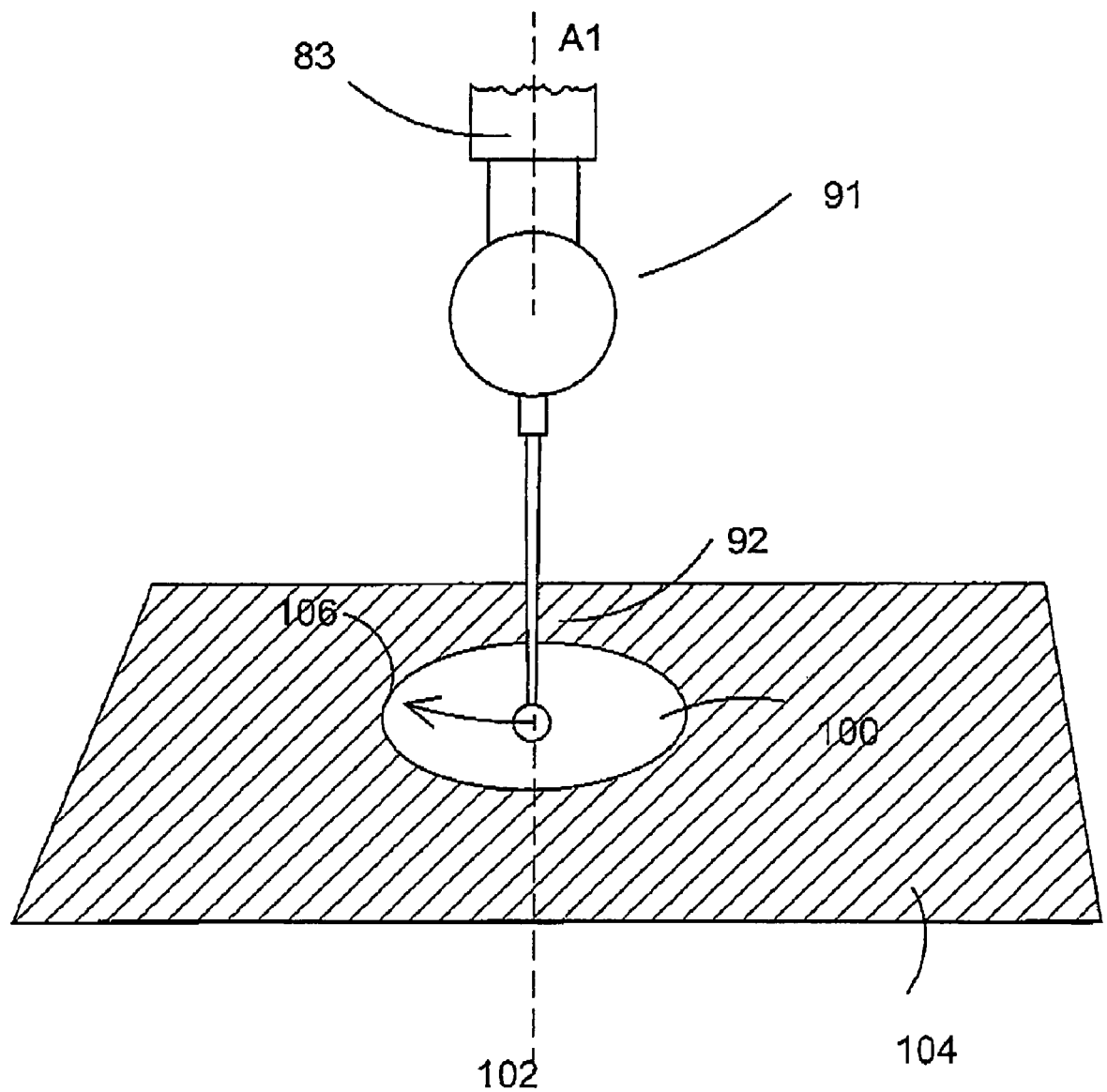
FIG. 25 illustrates an articulating probe head aligned with the central axis of a bore.

FIG. 25 illustrates a surface 104 of a workpiece having a vertical bore 100 with a centre line 102. In a first step the articulating probe head 91 is aligned with the central axis 102 of the bore 100. The measurement probe 92 is rotated about one axis (in this case the A2 axis) to bring it into contact with the surface of the bore 100 and a measurement is taken of surface point 106. This may be carried out a slow speed to minimise any dynamic errors. Alternatively, the measurement of surface point 106 could be taken by using the CMM or a combination of the CMM and articulating probe head to move the measurement probe, although this has the disadvantage of a more complex motion.

Figure 26:
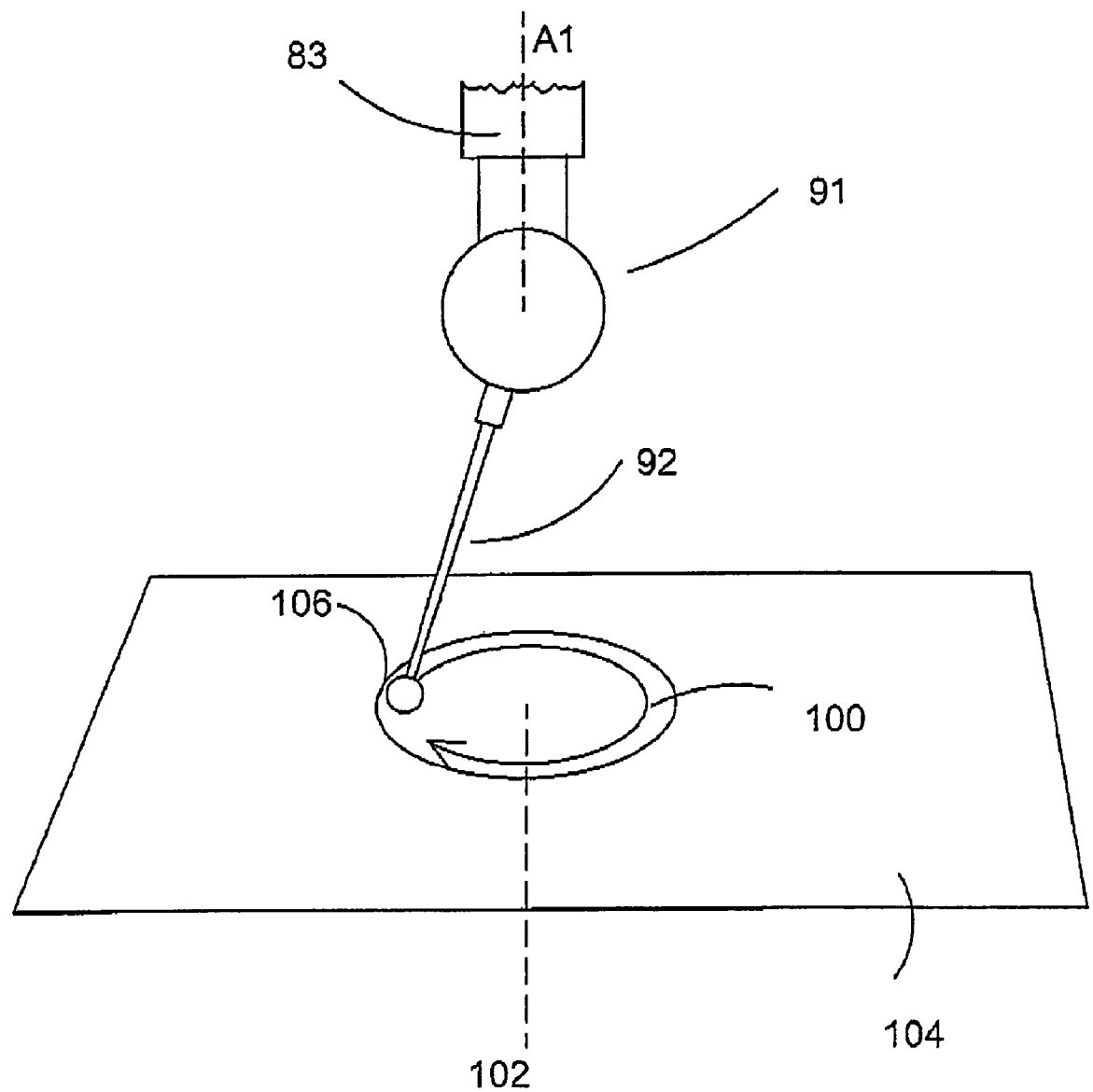
FIG. 26 shows the articulating probe head of FIG. 25, positioned so that the probe tip contacts the edge of the bore.

As illustrated in FIG. 26, the measurement probe 92 is then rotated about the central axis 102 of the bore 100 by the articulating probe head at a fast speed (in this case by rotating the articulating probe head 91 around the A1 axis), whilst surface measurements are recorded. The measurement probe is rotated sufficiently to ensure that the surface point 106 is measured in this step.

At the single point 106 where the measurement probe first contacted the surface there are two measurements, one corresponding to the measurement when the probe initially contacted the surface and a second when the measurement probe was rotated about the central axis of the bore at a fast speed. The second measurement will have been effected by dynamic errors whilst the first measurement will not. The difference between the measurements is the radial error, which is caused by dynamic error.

During the measurement of the bore at fast speed, the radial error of the measurements around the circumference will be similar. If the articulating probe has uniform stiffness, there will be constant acceleration during the measurement. The bending of the structure (articulating probe head, CMM and probe) is thus uniform, resulting in the radial error being the same throughout. Therefore, the correction factor generated for the surface point 106 can be applied to all the measurements around the circumference of the bore. Even if the acceleration is not constant throughout the measurement of the bore (i.e. through non uniform stiffness of the articulating probe head), the variation in bending of the structure and thus radial error is sufficiently small to be able to apply the same correction to the measurements around the bore.

This method therefore has the advantage that a single measurement point can be used to correct all the high speed measurement of a feature, thus reducing the time taken to measure the feature.

The initial measurement of the surface point 106 may be taken using an extrapolation to zero technique, an example of which is described in WO00/62015 which is incorporated herein by reference.

The initial measurement is taken by driving the measurement probe into the surface of an object along its normal, until a predetermined stylus deflection has been reached. The outputs of the transducers of the coordinate positioning apparatus and measurement probe are simultaneously recorded on one or both of moving the probe toward or away from the surface. The measurements are extrapolated to determine the measurement which would have been taken when the probe deflection is zero. This extrapolated value relates to when the probe is just in contact with the surface. This method enables an accurate measurement of the surface point to be taken, which is not effected by dynamic or static errors, as there is zero force between the stylus tip and workpiece at the extrapolated value.

Although FIGS. 24-26 illustrate a contact measurement probe, this method is also suitable for a non contact measurement probe, such an optical, capacitance or inductance probe. Even though these probes do not contact the surface, the machine structure still bends due to acceleration, thus radial errors are still created.

Figure 27:
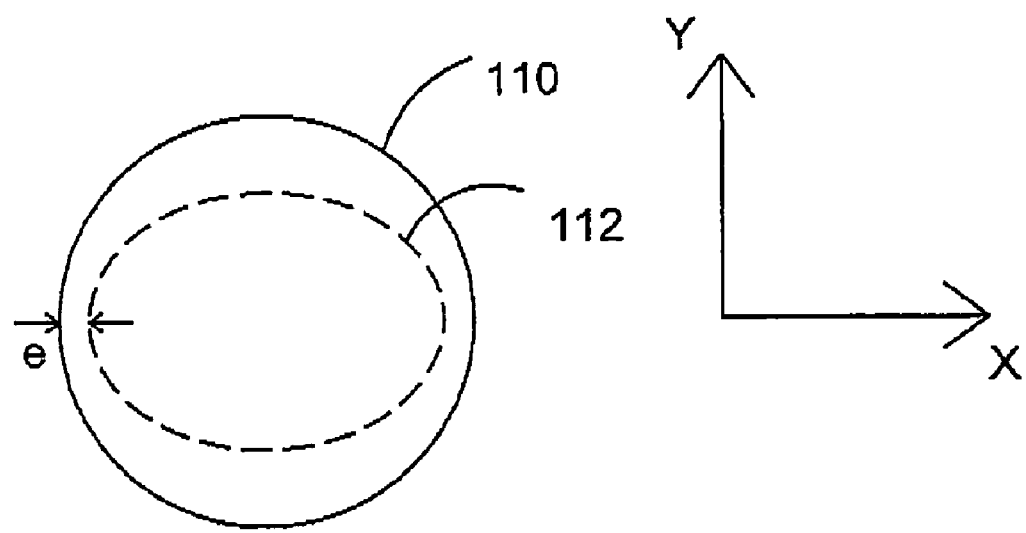
FIG. 27 illustrates the correct dimensions and the measured dimensions of a bore measured by a measurement probe mounted on a CMM.

Although the embodiment described with reference to FIGS. 24-26 describes the use of an articulating probe head, this method is also suitable for use with a probe mounted directly on a CMM or other coordinate positioning apparatus. In this case, the coordinate apparatus may not have uniform stiffness along each axis. For example the X axis may be stiffer than the Y axis. FIG. 27 illustrates the correct dimensions 110 and the measured dimensions 112 during the measurement of a bore. In this example the X axis is stiffer than the Y axis, resulting in a smaller radial error e in the X axis than the Y axis. However, by measuring the radial error e at one point as described above and applying a corresponding correction to all the measurements, the accuracy of the measurements will still be improved.

Figure 28:
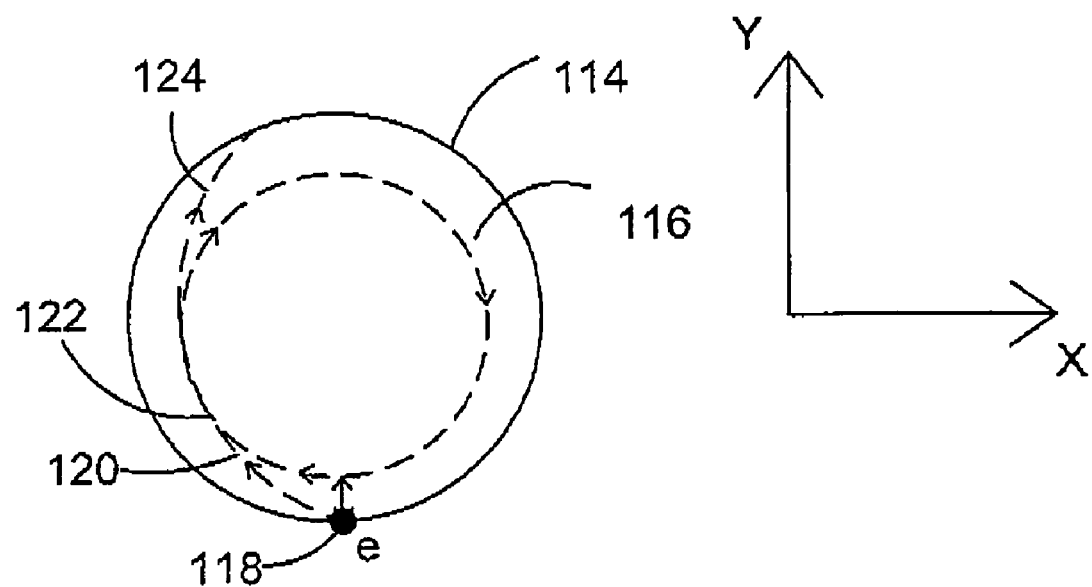
FIG. 28 illustrates the measured dimensions during the measurement of a bore in which the bore is over-scanned.

When measuring a circular feature, the speed during the measurement may not be constant as the coordinate positioning apparatus (whether or not it includes an articulating probe head) starts at zero speed, ramps up to constant speed and then ramps down to zero speed during the scan. The change of speed has an effect on the bending of the structure, causing the radial error to change. This may be overcome by over-scanning the feature, as illustrated in FIG. 28, which illustrates the correct dimensions 114 and the measured dimensions 116 during the measurement of a bore. As illustrated in FIG. 28, a measurement point 118 is taken. Starting at this point, the feature is measured by ramping up the speed to constant speed. FIG. 28 shows how the change in radial error of the section of the curve 120 at which the measurement speed is changing. At point 122 the probe is moving at constant speed and radial error is now constant. The feature is measured at constant speed until point 118 where the first measurement was taken has been measured a second time. The measurement speed is then decreased, as shown by the portion of the curve. Preferably, the overlap is such that the whole of the feature has been measured at constant speed. The radial error e is determined from the difference between the measurement point from the first measurement 118 and that at constant speed 116. This is then applied to all the constant speed data.

The method described with reference to FIGS. 24-28 is suitable for measuring circular features, for example bores, bosses and cylinders.

This method is suitable for error correction on a workpiece being measured. It is also suitable for generating an error function or map for a workpiece in a series which can be used to correct error in subsequent workpieces in the series. Likewise, it car be used to generate an error function or map for an artefact which has features which correspond to features of a workpiece in a series of workpieces. Such an artefact would typically have features of the same dimensions as the workpiece and/or in the same locations as the workpiece.

The invention claimed is:

1. A method of measuring an object using a surface sensing device mounted on a coordinate positioning apparatus, the method comprising:
   (a) measuring a single surface point of a feature of the object with the surface sensing device;
   (b) moving the surface sensing device along a path around the feature at a fast speed, thereby taking measurements along the path, including at the surface point;
   (c) determining the difference between the measurement of the surface point in step a) and in step b); and
   (d) using the difference determined in step c) to apply a correction to the object or subsequent objects having the same feature.

2. A method according to claim 1 wherein the surface point is measured in step (a) at a slow speed.

3. A method according to claim 1 wherein the measurement of the surface point in step (a) is determined by taking multiple measurements of the surface point at different stylus deflections or probe forces and extrapolating the measurement data to that corresponding to zero stylus deflection or zero probe force.

4. A method according to claim 1 wherein the coordinate positioning apparatus comprises an articulating probe head which can rotate a surface sensing device about two or more axes and wherein the step of moving the surface sensing device along a path in step (b) is achieved by motion of the articulating probe head.

5. A method according to claim 4 wherein the feature has a centre line and wherein in step (b) the articulating probe head is positioned at the centre line.

6. A method according to claim 1 wherein the surface sending device is a measurement probe.

7. A method according to claim 6 wherein the measurement probe is a contact probe, having a workpiece contacting stylus which is deflectable from a rest position.

8. A method according to claim 6 wherein the measurement probe is a non contact probe.

9. Apparatus for measuring an object using a surface sensing device mounted on a coordinate positioning apparatus, the apparatus comprising a controller for carrying out the following steps:
 (a) positioning the surface sensing device to measure a surface point of a feature of the object;
 (b) moving the surface sensing device along a path around the feature at a fast speed, thereby taking measurements along the path, including at the surface point;
 (c) determining the difference between the measurement of the surface point in step a) and in step b); and
 (d) using the difference determined in step c) to apply a correction to the object or subsequent objects having the same feature.

10. Apparatus according to claim 9 wherein the surface point is measured in step (a) at a slow speed.

11. Apparatus according to claim 9 wherein the measurement of the surface point in step (a) is determined by taking multiple measurements of the surface point at different stylus deflections or probe forces and extrapolating the measurement data to that corresponding to zero stylus deflection or zero probe force.

12. Apparatus according to claim 9 wherein the coordinate positioning apparatus comprises an articulating probe head which can rotate a surface sensing device about two or more axes.

13. Apparatus according to claim 12 wherein the feature has a centre line and wherein in step (b) the articulating probe head is positioned at the centre line.

14. Apparatus according to claim 13 wherein the intersection of said two or more axes is positioned at the centre line.

15. Apparatus according to claim 9, wherein the surface sensing device is a measurement probe.

16. Apparatus according to claim 15 wherein the measurement probe is a contact probe, having a workpiece contacting stylus which is deflectable from a rest position.

17. Apparatus according to claim 15 wherein the measurement probe is a non contact probe.

\* \* \* \* \*